United States Patent Office 2,791,510
Patented May 7, 1957

2,791,510

RUST PREVENTIVE COMPOSITION

Lorne W. Sproule and John L. Tiedje, Sarnia, Ontario, Canada, assignors to Esso Research and Engineering Company, a corporation of Delaware No Drawing. Application September 24, 1952, Serial No. 311,310

8 Claims. (Cl. 106—14)

The present invention relates to rust preventive compositions and particularly to rust preventive compositions of the so-called solvent and film type. These compositions, as is well known, involve a substantial proportion of volatile solvent which evaporates after the rust preventive composition is applied to a surface to leave an adherent film which gives prolonged protection to the surface.

As is well known in the art, the rusting of ferrous metals is a serious problem and numerous compositions have been proposed, including slushing oils and various film forming materials, to prevent or at least to reduce appreciably the damaging effect of rust, particularly in humid and/or tropical climates.

A reasonably successful rust inhibiting composition of the film forming type in the prior art has been one which contained a substantial proportion of a natural fat or wax such as degras or lanolin in combination with a sulfonate and auxiliary corrosion inhibitors, dispersed in a volatile solvent. The solvent evaporates after application of the composition to leave the adherent protective film on the surface which is to be protected. While this composition has enjoyed considerable commercial success it has certain limitations and some of its ingredients are relatively expensive. An object of the present invention is to make a less expensive composition, or a composition of ingredients which are more readily available, and also to improve the rust protection given by such a rust inhibitor.

According to the present invention it has been discovered that certain paraffin waxes of relatively very low melting points may be used as film forming materials in combination with certain partial esters which per se have been used in oils in the past to inhibit corrosion. The prior art has considered the paraffin waxes useless, partly because they are relatively insoluble in ordinary non-aromatic solvents such as painters' naphtha, Stoddard solvent, and the like, and partly because they have not shown rust preventing characteristics to any marked degree. It has now been discovered, however, that a paraffin wax of relatively very low melting range and correspondingly low molecular weight may be used successfully in lieu of degras and in partial replacement of sulfonates. When such a wax is selected it is soluble to a good degree in the non-aromatic hydrocarbon solvents of volatile type. In combination with the partial esters of polyhydric alcohols such as pentaerythritol monooleate, sorbitan monooleate, and related materials it has outstanding properties in preventing rusting of ferrous metals.

The low melting paraffin wax by itself has been tested for comparative purposes as a rust preventive and it is relatively ineffective. The prior art also has suggested combinations of petrolatum and inhibitors but for purposes of this invention such are not at all satisfactory, as will be shown below.

In order to make comparative tests a number of compositions were subjected to the standard AN-H-31 humidity cabinet rusting test. This test, as is well known, comprises suspending sand blasted steel strips in moist air which is maintained at a uniform high temperature and at a relative humidity of 95 to 100%. In the present case tests were conducted at 120° F.

The prior art commercial composition mentioned above, which consists of 5% by weight of sodium sulfonate on a dry basis with 10% of neutral degras and 85% of a painter's naphtha type non-aromatic hydrocarbon solvent boiling between 310 and 390° F., was subjected to the humidity cabinet test. For a test period of 70 hours this composition gave good protection, only 1% of the area of the steel strip being rusted. However, when the test was extended to 265 hours the panel was rusted over its entire area.

By comparison, tests were made on several examples listed below.

EXAMPLE 1

A composition containing 10% of petrolatum and 90% of the non-aromatic solvent mentioned above was subjected to the humidity cabinet test under conditions described above and showed 100% rusting at the end of 70 hours.

EXAMPLE 2

Instead of petrolatum a petroleum wax derived from a Mid-Continent Louden oil having a melting point between 110° and 116° F. was used in proportions of 10% by weight along with 90% of the non-aromatic naphtha solvent previously described. As in the case of the petrolatum this permitted complete rusting of the steel strip in 70 hours in the humidity cabinet test.

EXAMPLE 3

Example 1 was repeated except that 2% of sorbitan monooleate sold under the trade name "Span 80" was added to the 10% petrolatum and 88% solvent. In 70 hours two test strips showed respectively 25 and 70% of the surface rusted. At the end of 265 hours these had increased respectively to 40 and 80%. This indicates that petrolatum with the rust inhibitor has some rust preventive properties although it is not very satisfactory.

EXAMPLE 4

10% by weight of petroleum wax of melting point 110 to 116° F. and average molecular weight about 350, the same as used in Example 2, was combined with 2% of sorbitan monooleate (Span 80) and 88% of the non-aromatic solvent naphtha. At the end of 70 hours two test strips showed no rusting whatever and when the test was continued to 265 hours they still were completely free of rust. This is regarded as exceptional performance. When the low cost of the ingredients is considered along with the outstanding performance this appears to be a very distinct advance in the art. The data are summarized and tabulated below in Table I. It has been known in the art (e. g. United States Patent No. 2,434,490) that ester type wetting agents such as sorbitan monooleate in lubricating oil and in petrolatum gives reasonably good protection against rust. The use of waxes, broadly, has also been suggested. The outstanding advantage gained by switching from petrolatum to low melting paraffin waxes of low molecular weight had not been anticipated, however, and was entirely unexpected. Compare Examples 3 and 4 above and also in the following table. There seems to be a definite and hitherto unknown synergistic action between these particular waxes and the partial esters which serve as wetting agents.

Table I
AN-H-31 [1] HUMIDIFIER DATA

| Test Product | Commercial "A" | Ex. 1 | Ex. 2 | Ex. 3 | Ex. 4 |
|---|---|---|---|---|---|
| Formula, percent by wt.: | | | | | |
| Sod. Sulfonate (Dry Basis) | 5 | 0 | 0 | 0 | 0 |
| Neutral degras | 10 | 0 | 0 | 0 | 0 |
| Petrolatum No. 7 | 0 | 10 | 0 | 10 | 0 |
| Petroleum Wax, M. P. 110°–116° F | 0 | 0 | 10 | 0 | 10 |
| Sorbitan monooleate (Span 80) | 0 | 0 | 0 | 2 | 2 |
| Non-aromatic solvent, boil. range 310°–390° F., Aniline point 132° F., A. P. I. gravity 47.9 | 85 | 90 | 90 | 88 | 88 |
| Rusting percent, after: | | | | | |
| Time— | | | | | |
| 70 hours | 1 | 100 | 100 | 25, 70 | 0, 0 |
| 265 hours | 100 | | | 40, 80 | 0, 0 |

[1] Sand blasted steel strips suspended in moist air (95–100% relative humidity) at 120° F. The rusting is estimated percentage of the total surface area of the steel strip.

As noted above the insolubility of ordinary petroleum waxes which melt at 125° to 150° F. or higher in ordinary naphtha solvents has ruled them out of consideration in the prior art. Petrolatum, which is semi-solid and consists of about equal parts of wax of very wide melting range (100°–180° F.) and high molecular weight (600+) and mineral oil, is soluble to some extent in solvent naphtha but even in combination with an active rust inhibitor it does not form a satisfactory protective film. Moreover it is very easily removed from the metal surface by accidental contact or mild abrasion whereas the low melting wax film deposited when the product of Example 4 is used is quite adherent and gives good protection even under mild abrasion conditions.

It may be noted also that the waxes which are most satisfactory are those having melting points below 125° F. and preferably between 100 and 120° F. which are derived from light paraffinic distillates. The low melting point waxes from distillates of higher viscosity oils are not as soluble in the non-aromatic naphtha type solvents. Thus, the waxes from three Mid-Continent Louden distillates of SAE 10 (about 350 molecular weight), SAE 30 (about 500 molecular weight), and SAE 60 grade (about 600 molecular weight) respectively were recovered and tested comparatively. These waxes have melting points which ranged from 100 to 140 and were fractionated to select the most suitable materials. Those wax fractions having melting points between 100 and 116° F. and obtained from the light paraffin distillates (SAE 10) had excellent solubility and appeared to be most suitable for the production of heavy film type rust preventives. It is not entirely clear why the higher molecular weight waxes of similar melting point are less satisfactory but such seems to be the case.

In general, suitable compositions may be prepared using from 5 to 20% of the wax in the solvent with 1 to 5% of the partial long chain fatty acid ester of polyhydric alcohol. It is preferred, however, to use about 8 to 12% of a paraffin wax of melting point between 100 and 120° F. and average molecular weight below 500, preferably between 300 and 400, with 1 to 5% of the partial ester and 83 to 91% of the non-aromatic hydrocarbon solvent. The latter should have a boiling range between 150 and 450° F., preferably between 250 and 400° F. A still narrower cut having a boiling range between 300 and 400° F. is deemed particularly suitable.

In addition to or in lieu of sorbitan monooleate other partial esters of the long chain ($C_{12}$ to $C_{22}$) fatty acids with polyhydroxy aliphatic alcohols may be used. The sorbitans and pentaerythritols are preferred as the alcohols and the oleate mono-esters are the preferred esters. The monooleate esters of either of these alcohols are about equivalent and are particularly preferred. However, the monostearates, monolaurates, and dioleates of these and related alcohols may also be used as well as the ethylene oxide condensation products of such esters. Some of the latter are marketed by the Atlas Powder Company under the trade name "Tweens."

The composition of Example 4 above is deemed to be particularly suitable as well as economical for many applications such as the protection of freshly machined steel products. It is presently preferred for most of the purposes of this invention but it will be understood that variations in proportions and in types of components may be required for particular purposes, as will be obvious to those skilled in the art.

Obviously, supplemental inhibitors such as sodium nitrite, sodium benzoate, and other organic and inorganic inhibitors, deactivators, anti-oxidants and the like may be used in combination with the ingredients named above. Also materials such as fatty or naphthenic acid soaps of various metals may be added to harden or toughen the film. Adhesive or tackiness agents such as polyisobutylene and related polymeric materials of known type may be included in small proportions where it is desired to have strong adhesion of the film to the surface being protected.

What is claimed is:

1. A rust inhibiting composition of the solvent and film type consisting essentially of about 8 to 12% by weight of paraffin wax of melting point between 100 and 120° F. and molecular weight between 300 and 400, 1 to 5% of a partial long chain fatty acid ester of polyhydric alcohol, and a major proportion of a predominantly non-aromatic hydrocarbon solvent having a boiling range between 150 and 450° F., said paraffin wax being soluble in said solvent.

2. A rust inhibiting composition consisting essentially of 8 to 12% by weight of paraffin wax of melting point between 100 to 120° F. and molecular weight below 500, 1 to 5% of a long chain mono- fatty acid ester of a polyhydric alcohol, and 83 to 91% of a naphtha hydrocarbon of boiling range between 250 and 400° F., said paraffin wax being soluble in said solvent.

3. Composition according to claim 2 wherein the fatty acid ester is an oleate.

4. Composition according to claim 2 wherein the polyhydric alcohol is sorbitan.

5. Composition according to claim 2 wherein the polyhydric alcohol is pentaerythritol.

6. A rust inhibiting composition of the solvent and film type consisting essentially of about 10% by weight of a paraffin wax of Mid-Continent base having a melting point between 110° and 116° F. and an average molecular weight between 300 and 400, about 2% monooleate ester of an aliphatic polyhydric alcohol, and about 88% of a volatile solvent naphtha of boiling range about 300 to 400° F., said paraffin wax being soluble in said solvent.

7. Composition according to claim 6 wherein the alcohol is sorbitan.

8. Composition according to claim 6 wherein the alcohol is pentaerythritol.

References Cited in the file of this patent
UNITED STATES PATENTS

| | | |
|---|---|---|
| 2,182,992 | Lebo | Dec. 12, 1939 |
| 2,359,946 | Sudholz et al. | Oct. 10, 1944 |
| 2,434,490 | Duncan | Jan. 13, 1948 |
| 2,535,604 | Heinz et al. | Dec. 26, 1950 |
| 2,559,398 | Capell | July 3, 1951 |
| 2,560,202 | Zimmer et al. | July 10, 1951 |
| 2,672,444 | Wasson | Mar. 16, 1954 |
| 2,716,611 | Paxton | Aug. 30, 1955 |

FOREIGN PATENTS

| | | |
|---|---|---|
| 607,013 | Great Britain | Aug. 24, 1948 |

OTHER REFERENCES

Warth, The Chemistry and Technology of Waxes, Reinhold Publishing Co., New York, 1947, pp. 228 and 229.